United States Patent [19]

Revol et al.

[11] Patent Number: 4,869,630
[45] Date of Patent: Sep. 26, 1989

[54] EXPANSION PEG HAVING FIRST AND SECOND EXPANSION MEMBERS FRANGIBLY CONNECTED TOGETHER

[75] Inventors: Gérard Revol, Chateaudouble; Jean-Paul Barthomeuf, Alixan Le Village, both of France

[73] Assignee: Societe De Prospection Et D'Inventions Techniques (S.P.I.T.), Bourg-Les-Valence, France

[21] Appl. No.: 167,219

[22] Filed: Mar. 11, 1988

[30] Foreign Application Priority Data

Mar. 12, 1987 [FR] France ................................ 87 03406

[51] Int. Cl.⁴ .......................... F16B 13/04; F16B 13/06
[52] U.S. Cl. ......................................... 411/40; 411/42; 411/61
[58] Field of Search ...................... 411/40, 42, 43, 54, 411/60, 61, 79, 80, 78, 75

[56] References Cited

U.S. PATENT DOCUMENTS

| 4,002,100 | 1/1977 | Bucheli | 411/61 |
| 4,642,008 | 2/1987 | Herb | 411/61 |
| 4,673,322 | 6/1987 | Schiefer | 411/40 |

Primary Examiner—Neill R. Wilson
Attorney, Agent, or Firm—Schwartz & Weinrieb

[57] ABSTRACT

An expansion peg is provided including a tubular socket threaded at one end, and having a split and expandable portion at the other end thereof which is disposed inside the socket. A first wedge intended to come into abutment against the bottom of an anchorage hole and a second wedge detachably secured to the first wedge and intended, under the action of a striking tool, to become disengaged from the first wedge and to cooperate therewith for causing expansion of the split end of the socket, is disposed within the socket and split end portion thereof.

20 Claims, 2 Drawing Sheets

EXPANSION PEG HAVING FIRST AND SECOND EXPANSION MEMBERS FRANGIBLY CONNECTED TOGETHER

FIELD OF THE INVENTION

The present invention relates to an expansion peg comprising a tubular element having a securing end and a split expandable end which is intended to be introduced into an anchorage hole by means of its split end and, within the tubular element, there is provided expansion means for causing expansion of the split end under the action of a striking tool.

BACKGROUND OF THE INVENTION

Pegs similar to that of the present invention; are already known, particularly from the document FR-A-2 130 091, used for example for fixing covering panels upon concrete walls.

The pegs of this type which are presently available upon the market are characterized by means of a manufacturing cost which is too high, the tubular element of the above mentioned document, for example, having several portions of different internal diameters.

OBJECT OF THE INVENTION

The present invention therefore proposes a peg of the above mentioned type, which is easy to manufacture and therefore inexpensive to produce.

SUMMARY OF THE INVENTION

Accordingly, the present invention provides a peg in which the tubular element is a socket with a constant and circular internal cross section and the expansion means includes first means intended to come into abutment against the bottom of the anchorage hole and second means detachably secured to the first means such that, under the action of the striking too, the second means becomes separated from the first means and cooperates therewith for causing expansion of the split end of the expansion peg.

In the preferred embodiment of the peg of the present invention, the first and second expansion means are formed by means of two semi-tubular wedges joined together at least along a fracturable zone defined therebetween and forming with the socket one and the same piece obtained from a stamped, bent and rolled metal sheet.

BRIEF DESCRIPTION OF THE DRAWINGS

The invention will be better understood from the following description of several embodiments of the peg of the invention, with reference to the accompanying drawings in which.

DESCRIPTION OF THE PREFERRED EMBODIMENTS

Figure 2:
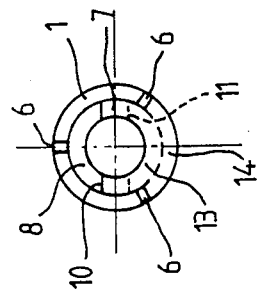
FIG. 2 is an end view of the peg shown in FIG. 1.
Figure 1:
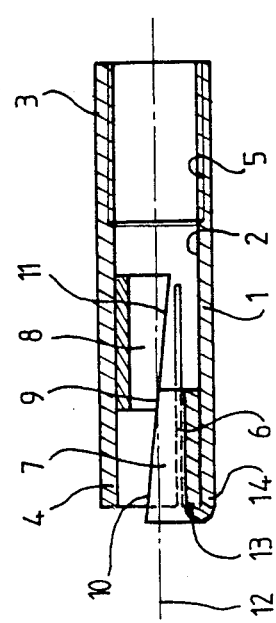
FIG. 1 is an axial sectional view of the preferred embodiment of the peg of the invention.

The peg shown in FIGS. 1 and 2 includes a socket 1 having an axis 12 and whose inner wall 2 has a constant circular cross section, and which extends from a securing end 3 to an opposite expandable end 4. The end portion 3 is provided with internal tapping 5 for threadedly engaging a fixing bolt which will be described hereinbelow. An external thread could alternatively be provided upon this portion 3. The end portion 4 is provided with slits 6, here three in number, for expansion thereof through spreading out of the legs formed between the slits. The peg also includes, inside the socket, a first wedge 7 projecting slightly from the expandable end 4 of the socket and a second wedge 8 connected to the first wedge 7 along two fragile fracturable zones 9. These two wedges 7, 8 have a semi tubular shape, with their respective cylindrical walls mating with the inner wall 2 of the socket and with their respective planes 10, 11 of their free longitudinal edges inclined with respect to axis 12 of the socket and with respect to each other such that the larger diameter portion of one wedge is initially disposed in a radial plane opposite a smaller diameter portion of the other wedge. Wedge 8 is thus interlocked with wedge 7 which, at its external edge 13, is interlocked with the socket through means of the edge 14 of the expandable end portion.

Figure 3:
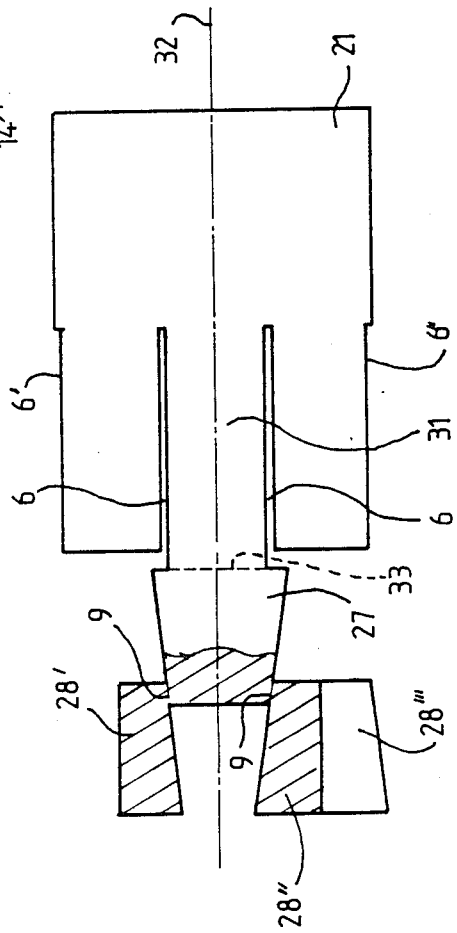
FIG. 3 is a top view of a stamped metal sheet blank for forming the peg shown in FIG. 1 by bending and rolling processes.

The peg which has just been described was formed from a metal sheet blank. Referring to FIG. 3, in accordance with this metal sheet blank the developed surface of the socket and the two wedges of the peg have been stamped therefrom, and thus a substantially rectangular part 21 has been obtained so as to form the socket 1, a trapezoidal part 27 forming the first wedge 7, which extends axially from the rectangular portion 21 beyond the central portion thereof, and two other trapezoidal parts 28', 28" forming the second wedge 8, extending laterally outwardly from opposite sides of the trapezoidal part 27.

The trapezoidal part 27 in fact extends axially beyond a leg 31 located between two slits 6 formed within rectangular part 21 so as to extend parallel to the long sides thereof. The long sides have been stamped at 6', 6", so as to have the same length as slits 6, so as to form the third slit 6 of the socket. The large base 33 of the trapezoidal part 27 is common with leg 31 as a result of being integrally formed therewith. Each lateral trapezoidal part 28', 28" corresponds substantially to one half of part 27, the external edges of these lateral parts being disposed substantially parallel to the long sides of the rectangular part 21 and the internal edges thereof axially extending, in effect the external edges of the trapezoidal part 27, by means of, on each side thereof, a common portion 9. The length of the long sides of part 21 is equal to that of socket 1 with, the length of its small sides being substantially equal to the circumference of the socket. The length of the trapezoidal parts 27, 28', 28" is of course equal to that of the wedges.

It will be noted that, instead of stamping the trapezoidal part 28' so as to be symmetrical with part 28" with respect to the line of symmetry 32 of the assembly, a trapezoidal part comprising sections 28''', 28'''' could just as well have been stamped so as to be identical to part 27, but turned around or reversed with respect thereto, the portion 28'''' of this part 28''', 28'''' being symmetrical with respect to the portion 28''' with respect to its common disposed edge parallel to line 32.

Figure 4:
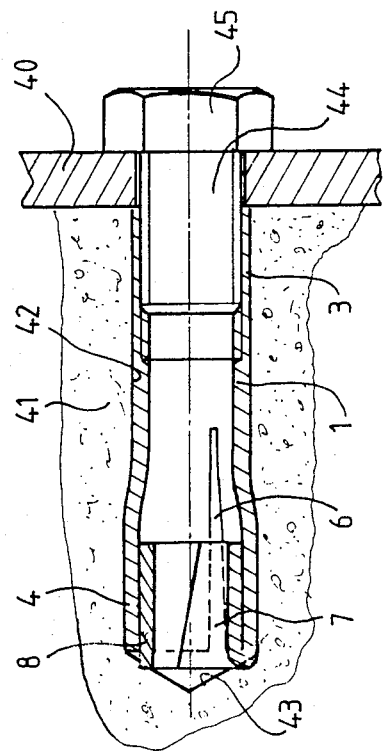
FIG. 4 is a top view of another stamped metal sheet blank for forming a peg similar to the peg shown in FIG. 1 by bending and rolling processes.

Likewise, instead of stamping the central trapezoidal part 27 as an extension of the rectangular portion 21, as in FIG. 3, the arrangement of this central trapezoidal portion and of the other lateral trapezoidal portions could be reversed, so as to stamp the lateral trapezoidal portions 128', 128" as extensions of the rectangular portion 121 located or interposed between this rectangular portion 121 and the central trapezoidal portion 127 (FIG. 4). In this case, the lateral edges of this central portion 127 are inclined in a direction opposite that of the central portion 27 of FIG. 3.

With the metal sheet blank thus stamped, the trapezoidal parts 27, 28 are folded back over the rectangular part 21, about the large base 33 of the part 27. Then these metal sheet portions are rolled into a cylinder having an axis disposed parallel to line 32 and closed along a generatrix merging with the longitudinal edges of part 21, by any appropriate means such as, for example, clipping, welding, or the like. In FIG. 4 a cut out 125 and a tongue 126 can be seen for achieving a clipping operation.

Figure 5:
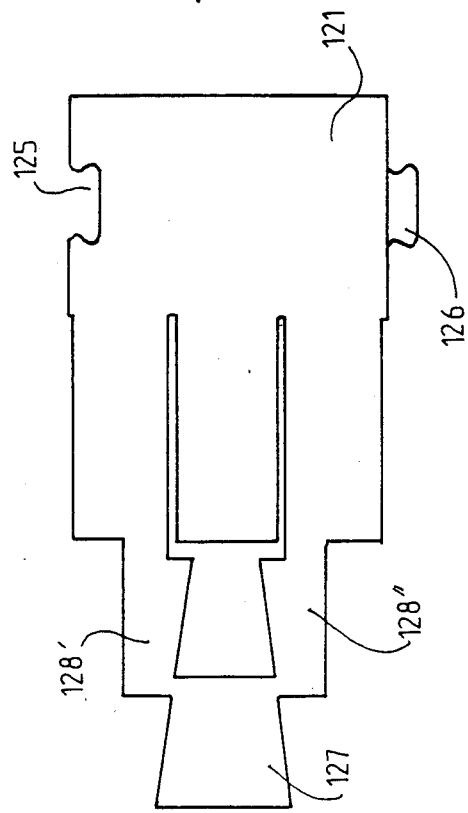
FIG. 5 is an axial sectional view of the peg shown in FIG. 1, used for anchoring and securing a covering panel to a wall.

The peg of the invention having been described, its use or operation will now be described with reference to FIG. 5.

It is supposed that the covering panel 40 is to be fixed upon a concrete wall 41.

An anchorage hole 42 is bored within in wall 41 so as to have a diameter corresponding to the outer diameter of the peg. Then the socket is inserted within the hole, by means of its end 4, and is driven into the hole until wedge 7 comes into abutment against the bottom interior end 43 of the hole. Then using a tool which is fitted into the socket through means of its end 3, wedge 8 is struck which fractures the fragile connecting zones 9 defined between the two wedges. With further striking, wedge 8 is driven into the socket, so as to axially move along wedging 7 along planes 10, 11 with a wedge effect. This effect causes opening of slits 6, spreading apart of the legs of the expandable portion 4 of the socket, and therefore expansion thereof and consequent anchorage thereof within the sidewalls defining hole 42.

Subsequently the panel 40 is applied against the wall and through means of an orifice bored within the panel a bolt 44 is threadedly engaged with the tapped part 3 of the socket so as to fix the panel between wall 41 and the head 45 of bolt 44.

Although the invention relates essentially to a peg formed from a single metal sheet blank, it will be noted that it is not indispensable, for preserving its monoblock character, for the peg of the invention to be thus formed. Thus the two wedges may be formed separately and then fixed to the tubular element by clamping, welding or bonding. Moreover, the wedge, intended to project slightly from the expandable end of the socket or the expandable end portion of the tubular element, may advantageously be provided with a holding flange, lug or collar.

Still further, the rear wedge may be held in position against an internal shoulder of the tubular element. It will be noted that, when the peg of the invention is not formed from the same metal sheet, the wedge shaped expansion element could be solid and not hollow.

It will finally be noted that passing from the blank shown in FIG. 3 to that shown in FIG. 4 is tantamount to reversing the fixed and movable wedge portions thereof.

Obviously, many modifications and variations of the present invention are possible in light of the foregoing teachings. It is therefore to be understood that within the scope of the appended claims, the present invention may be practiced otherwise than as specifically described herein.

What is claimed is:

1. An expansion peg type fastener for disposition within a bore defined within a support component, comprising:
    tubular element means, having a longitudinal, axis, a proximal end, and a radially expansible distal end, for disposition within said bore of said support component;
    first expansion means disposed interiorly within said tubular element means within the vicinity of said radially expansible distal end of said tubular element means;
    second expansion means disposed interiorly within said tubular element means and disposed at a first axial position relative to said first expansion means such that a trailing edge portion of said second expansion means is substantially aligned with a leading edge portion of said first expansion means within a radial plane located at a predetermined axial position along said longitudinal axis of said tubular element means; and
    frangible means, connecting said trailing edge portion of said second expansion means to said leading edge portion of said first expansion means, for permitting said second expansion means to move axially within said tubular element means toward said radially expansible distal end thereof and relative to said tubular element means and said first expansion means, under the influence of an axial force as applied to said second expansion means which fractures said frangible means, from said first axial position to a second axial position at which said second expansion means cooperates with said first expansion means so as to radially expand said radially expansible end of said tubular element into engagement with sidewall portions of said bore defined within said support component.

2. The peg as claimed in claim 1, wherein:
    said first and second expansion means comprise two wedges joined together by said frangible means.

3. An expansion peg as set forth in claim 1, wherein:
    said radially expansible distal end of said tubular element means comprises axially extending slit means defined within sidewall portions of said tubular element means for permitting said radial expansion of said radially expansible distal end of said tubular element means.

4. The peg as claimed in claim 1, wherein the proximal end of said tubular element means is tapped for threaded engagement with a threaded fastener.

5. The peg as claimed in claim 1, wherein said tubular element and said first and second expansion means form a single piece.

6. The peg as claimed in claim 5, wherein:
    said first and second expansion means comprise two wedges joined together by said frangible means.

7. The peg as claimed in claim 2, wherein said first wedge projects slightly from said radially expansible end of said tubular element means.

8. The peg as set forth in claim 7, wherein:
    said proximal end of said tubular element means is tapped for threaded engagement with a threaded fastener.

9. The peg as claimed in claim 5, wherein the proximal securing end of said tubular element means is tapped for threaded engagement with a threaded fastener.

10. The peg as claimed in claim 6, wherein the proximal end of said tubular element means is tapped for threaded engagement with a threaded fastener.

11. The peg as claimed in claim 5, wherein said tubular element and said first and second expansion means are formed from a stamped, bent and rolled metal sheet blank.

12. The peg as claimed in claim 11, wherein the proximal end of said tubular element means is tapped for threaded engagement with a threaded fastener.

13. The peg as claimed in claim 2, wherein the proximal end of said tubular element means is tapped for threaded engagement with a threaded fastener.

14. An expansion peg as set forth in claim 11, wherein:
said first and second expansion means both have the configuration of a trapezoid when said peg is in the form of said sheet blank.

15. An expansion peg as set forth in claim 11, further comprising:
means defined upon said tubular element means for securing opposite edge portions of said tubular element means together when said tubular element means is rolled into said tubular element means from said metal sheet blank.

16. An expansion peg as set forth in claim 14, wherein:
said first expansion means comprises two component parts each having the configuration of a trapezoid; and
said second expansion means comprises a single component part having the configuration of a trapezoid.

17. An expansion peg as set forth in claim 14, wherein:
each of said first and second expansion means comprises a single component part having the configuration of a trapezoid.

18. An expansion peg as set forth in claim 14, wherein:
said first expansion means comprises a single component part having the configuration of a trapezoid; and
said second expansion means comprises two component parts each having the configuration of a trapezoid.

19. An expansion peg as set forth in claim 18, wherein:
said two trapezoidal component parts of said second expansion means are symmetrically located upon opposite lateral sides of said longitudinal axis of said tubular element means.

20. An expansion peg as set forth in claim 18, wherein:
said two trapezoidal component parts of said second expansion means are located assymetrically upon one lateral side of said longitudinal axis of said tubular element means and relative to said first expansion means.

* * * * *